US011422888B2

(12) United States Patent
Hsieh et al.

(10) Patent No.: US 11,422,888 B2
(45) Date of Patent: Aug. 23, 2022

(54) DATA INTEGRITY CHECK FOR WRITING DATA IN MEMORY

(71) Applicant: WESTERN DIGITAL TECHNOLOGIES, INC., San Jose, CA (US)

(72) Inventors: Hsing Hsieh, San Jose, CA (US); John Randall, Fremont, CA (US); Victor Avila, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/180,660

(22) Filed: Feb. 19, 2021

(65) Prior Publication Data

US 2022/0114048 A1 Apr. 14, 2022

Related U.S. Application Data

(60) Provisional application No. 63/091,840, filed on Oct. 14, 2020.

(51) Int. Cl.
*G06F 11/00* (2006.01)
*G06F 11/10* (2006.01)
(Continued)

(52) U.S. Cl.
CPC ........ *G06F 11/1068* (2013.01); *G06F 3/0619* (2013.01); *G06F 3/0629* (2013.01);
(Continued)

(58) Field of Classification Search
None
See application file for complete search history.

(56) References Cited

U.S. PATENT DOCUMENTS 7,609,561 B2 10/2009 Cornwell et al.
9,508,437 B2 11/2016 Parker et al.
(Continued)

OTHER PUBLICATIONS

G. C. Cardarilli, M. Ottavi, S. Pontarelli, M. Re and A. Salsano, "Fault tolerant solid state mass memory for space applications," in IEEE Transactions on Aerospace and Electronic Systems, vol. 41, No. 4, pp. 1353-1372, Oct. 2005, doi: 10.1109/TAES.2005.1561889. (Year: 2005).*

(Continued)

*Primary Examiner* — Daniel F. McMahon
(74) *Attorney, Agent, or Firm* — Arentfox Schiff LLP (57) ABSTRACT

Aspects of a storage device including a memory and a controller are provided for error detection and data integrity checking during the data transfer of write operations. The memory includes a write enable input. The controller generates data integrity information based on at least one data byte to be written to the memory, and transfers the at least one data byte and the data integrity information to the memory, with the data integrity information being transferred to the write enable input. A data integrity circuit receives the at least one data byte and the data integrity information from the controller, and detects whether an error exists in the at least one data byte based on the data integrity information. Accordingly, error detection of data being written to memory may be improved by the data integrity checking of the data prior to being written to the memory of the storage device.

20 Claims, 6 Drawing Sheets

(51) Int. Cl.
*G06F 11/30* (2006.01)
*G06F 3/06* (2006.01)
*G06F 11/07* (2006.01)

(52) U.S. Cl.
CPC ........ *G06F 3/0679* (2013.01); *G06F 11/0772* (2013.01); *G06F 11/3037* (2013.01)

(56) References Cited

U.S. PATENT DOCUMENTS

| | | | |
|---|---|---|---|
| 9,626,106 B2 | 4/2017 | Hsu et al. | |
| 9,734,911 B2 | 8/2017 | Sinclair et al. | |
| 10,114,690 B2 | 10/2018 | Shah et al. | |
| 2004/0215877 A1* | 10/2004 | Chatterjee | G06F 11/1092 711/114 |
| 2005/0283650 A1* | 12/2005 | Zhang | G06F 11/1008 714/6.2 |
| 2006/0069947 A1* | 3/2006 | Takahashi | G06F 11/1076 714/5.11 |
| 2007/0180298 A1* | 8/2007 | Byrne | G06F 11/1076 714/6.2 |
| 2009/0077453 A1* | 3/2009 | Jones, Jr. | H03M 13/618 714/801 |
| 2009/0287882 A1* | 11/2009 | Sun | G06F 11/1076 711/114 |
| 2011/0271167 A1* | 11/2011 | Miyatake | G06F 11/1064 714/805 |
| 2013/0191697 A1* | 7/2013 | Amato | H03M 13/2936 714/755 |
| 2015/0067438 A1* | 3/2015 | Suzuki | G06F 11/1072 714/758 |
| 2015/0067448 A1* | 3/2015 | Son | G11C 29/52 714/773 |
| 2015/0363267 A1* | 12/2015 | Chandra | G01R 31/3187 714/801 |
| 2016/0203045 A1* | 7/2016 | Suzuki | G06F 11/1048 714/764 |
| 2019/0227749 A1 | 7/2019 | Wakchaure et al. | |

OTHER PUBLICATIONS

W. Jang, "Error-Correcting Code Aware Memory Subsystem," in IEEE Transactions on Computer-Aided Design of Integrated Circuits and Systems, vol. 33, No. 11, pp. 1706-1717, Nov. 2014, doi: 10.1109/TCAD.2014.2351494. (Year: 2014).*

* cited by examiner

DATA INTEGRITY CHECK FOR WRITING DATA IN MEMORY

CROSS-REFERENCE TO RELATED APPLICATION

This application claims the benefit of, and right of priority to, U.S. Provisional Patent Application No. 63/091,840, entitled "Data Integrity Check For Writing Data In Memory," filed on Oct. 14, 2020, the entire contents of which are incorporated herein by reference in its entirety.

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

A flash storage device may include multiple dies, each of which may include a block of memory. Various operations can be executed with the flash storage device. Examples of such operations include write operations and read operations. For a write operation, data may be written in one or more blocks of memory of one or more dies. For a read operation, data may be retrieved from one or more blocks or memory of one or more dies.

In some instances, execution of one operation may fail and/or produce an error, potentially leading to loss and/or corruption of data. For example, one or more data bits may be erroneously flipped at some point during transfer of the data bits during a write operation. Similarly, one or more data bits may be erroneously flipped at some point during retrieval of the data bits during a write operation.

According to implementations of flash storage devices, corrupted data is unable to be detected until the data is retrieved from the block(s) of memory of die(s). Therefore, a need exists for techniques and solutions to detecting errors in data before the data is read from memory.

SUMMARY

The present disclosure describes various aspects of storage devices that each is configured to detect errors in data when data is written to memory, such as errors that may occur during the transfer of data to memory during a write or program operation. Accordingly, the present disclosure provides various techniques and solutions to maintaining the integrity of data when the data is to be programmed into memory.

One aspect of a storage device is disclosed herein. The storage device includes a memory and a controller. The controller is configured to generate data integrity information based on at least one data byte to be written to the memory. The controller is further configured to transfer the at least one data byte and the data integrity information to the memory, and the data integrity information is transferred to the at least one output.

Another aspect of a storage device is disclosed herein. The storage device includes a memory and a controller. The controller is configured to set at least one bit for data integrity based on data to be written to the memory. The controller is further configured to send the data to the memory with the at least one bit, and the at least one bit is sent to at least one input of the memory.

A further aspect of a storage device is disclosed herein. The storage device includes a memory and a data integrity circuit connected to the memory. The data integrity circuit is configured to receive at least one bit on at least one input when receiving data to be written to the memory. The data integrity circuit is further configured to determine whether the data to be written to the memory is successfully received in response to receiving the at least one bit on the at least one input.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A storage device of the present disclosure generally includes multiple dies, with each die being a separate section of memory. For example, a storage device may include a NAND flash chip having multiple dies. The multiple dies may be connected to a controller via at least one bus, which may allow the controller and the multiple dies to communicate.

To interface, each die may be individually connected on a channel to the controller. Data transferred between the controller and each die may be carried on a respective channel. Accordingly, each of the channels may have a set of signals associated with the communication between the controller and a respective one of the dies. Signals may be assigned their functionalities according to the pins on which the signals are transmitted. In other words, a "first control" signal may be assigned to indicate "first control" information by virtue of the fact the "first control" signal is transmitted on a "first control" pin.

Examples of such signals include address latch enable (ALE), chip enable (CEn), command latch enable (CLE), input/output (I/O), data strobe (DSQ) signals, and/or other/different signals. Illustratively, ALE signals may load addresses into an address registers, CEn signals may enable or disable one or more dies (e.g., logical unit numbers (LUNs)), CLE signals may load commands into a command register, I/O signals may bi-directionally transfer data (and potentially address and/or command information), and DQS signals may provide synchronous reference for data input and output.

Further, some channels may have a write enable (WEn) signal. For example, the controller may include a WEn pin to output a WEn signal, and a die may include a corresponding WEn pin at which the WEn signal is received as input. When data is received from a host device for a write operation, a signal may be sent from the controller to the WEn pin of each of the dies to which data is to be written.

According to some implementations of some flash devices, a WEn signal may be sent when data is to be transferred to one of the dies. In particular, the WEn signal may be used for clocking to clock a command and address for data transfer of a write operation. For example, command and address may be latched at the rising edge of a WEn signal in response to being received for one of the dies to which data is being transferred. Thus, data may be transferred from the controller to one of the dies (e.g., via I/O signals), and the data may then be written in a block of memory of the one of the dies in response to first receiving a WEn signal.

With a WEn pin so configured to drive data transfer of a write operation (e.g., to clock a command and address for a write data transfer), a WEn signal may be regarded as a signal on a control path for data transfer of a write operation. The data being transferred (e.g., via I/O signals) to be programmed in a die, however, may be regarded as a signal on a data path.

However, the controller may hold the WEn pin in one state (e.g., a "high" state rather than a "low" state) when the data is being transferred from the controller to one of the dies. Thus, in some implementations of some devices, the WEn pin may be regarded as being in an "idle" state by virtue of its absence of use during the actual transfer of data from controller to die via bus.

According to various aspects of the present disclosure, a WEn pin may be configured (or implemented) to carry a signal on the data path, in addition or in alternative to, a configuration (or implementation) to carry a WEn signal on the control path. Specifically, the present disclosure describes embodiments of storage devices in which at least one pin is used to carry data integrity information during data transfers of write operations. For example, the WEn pin may be repurposed (or reused) to carry data integrity information during data transfers of write operations. In other words, the WEn pin would no longer be held in one state and regarded as idle during data transfer of write operations.

In some embodiments, a WEn pin may be configured to carry a parity bit associated with at least one byte of data. For example, a controller may generate a parity bit based on at least one byte of data, and the controller may then send the parity bit with the at least one byte of data to a die during the transfer phase of a write operation. Correspondingly, the die may receive the at least one byte of data (e.g., on an I/O pin) and the parity bit, with the parity bit being received on a WEn pin.

In some other embodiments, a WEn pin may be configured to carry at least one error correction code (ECC) byte associated with at least one byte of data. For example, a controller may the at least one ECC byte based on at least one byte of data, and the controller may then send the at least one ECC byte with the at least one byte of data to a die during the transfer phase of a write operation. Correspondingly, the die may receive the at least one byte of data (e.g., on an I/O pin) and the at least one ECC byte, with bits of the at least one ECC byte being received on a WEn pin (e.g., in serial).

As the speed of a bus on which data is transferred between a controller and a set of dies increases, and as the number of dies operating increases, the probability of a higher bit error rate (BER) may commensurately increase at the interface between the controller and the dies. However, storage devices may lack mechanisms for data integrity checking at such an interface; consequently, data to be written on a die may be lost or corrupted on the interface during write data transfers, but such loss or corruption would be go undetected until the controller reads such data and regards the data loss or corruption as a problem (e.g., bit corruption) with the die.

By repurposing (or reusing) a WEn pin to carry data integrity information when data to be written to a die is received from a controller on an interface during transfer phases of write operations, data integrity is able to be checked during transfer phases of write operations. Such data integrity checks may enable data loss or corruption on the interface (e.g., due to noise or other problems with a bus) to be detect (and potentially corrected) before erroneous data is written in the die. Accordingly, the present disclosure provides various techniques and solutions to checking data integrity during data transfer of write operations.

Figure 1:
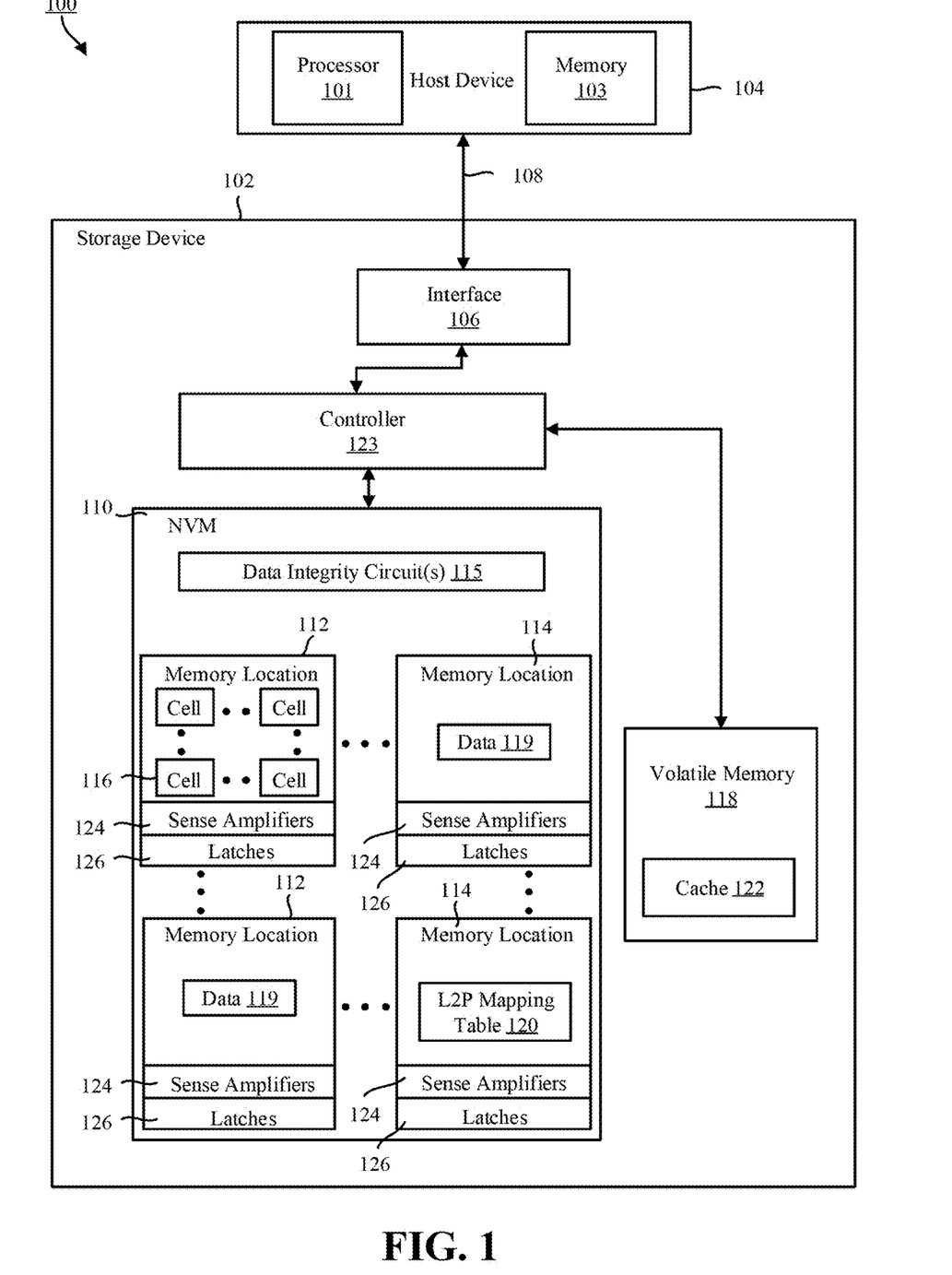
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Additionally or alternatively, the host 104 may be distributed across multiple remote entities, in its entirety, or with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive RAM (ReRAM) devices, magnetoresistive RAM (MRAM) devices, ferroelectric random-access memory (F-RAM), and any other type of non-volatile memory devices. In other examples, the host memory 103 may include volatile memory, such as RAM, dynamic RAM (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Additionally or alternatively, the host interface 106 may be wireless, and may interface the storage device 102 with the host 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. In some embodiments, the L2P mapping table 120 may be loaded into volatile memory 118 (e.g., from the NVM 110). The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
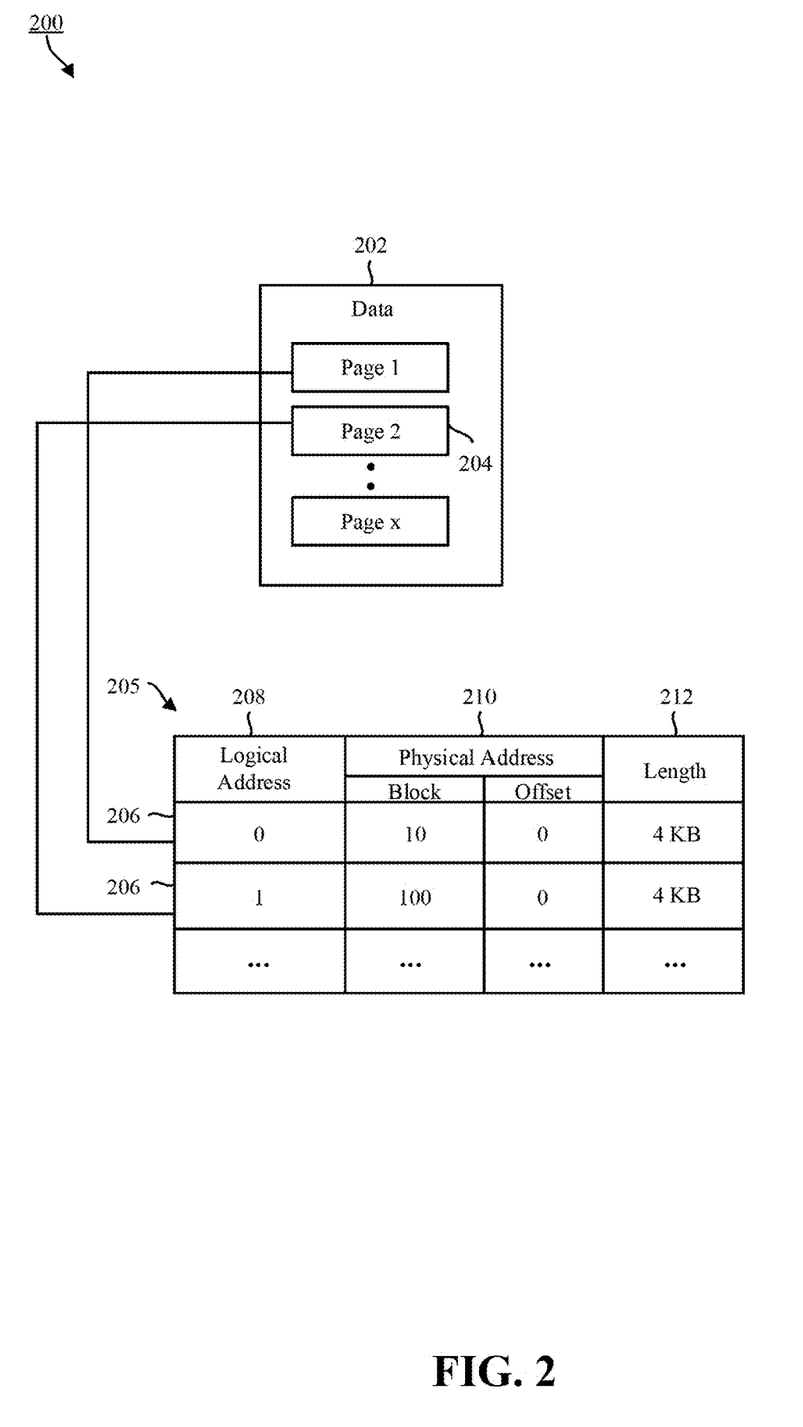
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data, e.g., 4 kilobytes (KB) or some other size.

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g., it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), FPGA, hard-wired logic, analog circuitry, and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g., translate the logical addresses into physical addresses), and access or store data in the cells 116 located at the mapped physical addresses.

The controller 123 and its components may be implemented with embedded software that performs the various functions of the controller described throughout this disclosure. Additionally or alternatively, software for implementing each of the aforementioned functions and components may be stored in the NVM 110 or in a memory external to the storage device 102 or host device 104, and may be accessed by the controller 123 for execution by the one or more processors of the controller 123. Additionally or alternatively, the functions and/or components of the controller may be implemented with hardware and/or firmware in the controller 123, or may be implemented using a combination of the aforementioned hardware, firmware, and/or software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

In some embodiments, the storage device 102 includes at least one data integrity circuit(s) 115, which may be connected to and/or integrated (or implemented) with the NVM 110. While the data integrity circuit(s) 115 are illustrated as within NVM 110, in some other embodiments, at least one data integrity circuit may be implemented outside of NVM 110 or implemented within one of the memory locations 112.

The data integrity circuit(s) 115 and its components may be implemented with embedded software, hardware, and/or firmware that performs one or more functions for the NVM 110 described throughout this disclosure. For example, at least one data integrity circuit(s) 115 may include gates, logic, and/or other such circuit configured to perform the various operations described herein. In another example, at least one data integrity circuit(s) 115 may include a processor.

In some embodiments, the at least one data integrity circuit(s) 115 may include software, hardware, and/or firmware at each of the memory locations 112; accordingly, each of the data integrity circuit(s) 115 may be configured to perform various functionality for a respective one of the memory locations 112. For example, a respective one of the data integrity circuit(s) 115 may communicate signals and execute operations with the controller 123.

The controller 123 may communicate with the memory locations 112, e.g., through the data integrity circuit(s) 115, via an interface. For example, the controller 123 may communicate with the data integrity circuit(s) 115 via the interface on a bus (collectively referred to herein as "bus/interface"). By way of illustration and not limitation, the interface and/or bus may be configured according to Toggle Mode (TM). However, other configurations are possible without departing from the scope of the present disclosure.

The controller 123 may communicate with the memory locations 112 in parallel or asynchronously. Potentially, errors (e.g., as measured by BER) may occur in data on the bus and/or interface during communication between the controller 123 and the memory locations 112. In particular, "errors" may refer to flipped and/or undetected bits, which may occur due to noise on the bus and/or other factors. For example, as speed on the bus increases and/or the number of memory locations 112 with which the controller 123 communicates increases, the BER may likewise increase. Without error detection or data checking of data transferred on the bus/interface, errors occurring on the bus/interface during data transfer may be undetected until a later time, at which point the source or the errors may be undiscoverable.

Illustratively, the controller 123 may receive a request from the host 104 to write data to write to the NVM 110. The controller 123 may execute a write operation so that the data is programmed into one or more of the memory locations 112 (e.g., cells) and, in so doing, the controller 123 may transfer the data over the bus/interface to the NVM 110. If one or more errors were to occur on the bus/interface during data transfer of the write operation, such one or more errors may be written to the one or more memory locations 112 unless detected or checked.

Absent error detection or checking, the errors in the data written in the memory locations 112 may remain undetected until the controller 123 receives a request from the host 104 to read the data from the NVM 110, at which point the controller 123 may detect the errors and inaccurately attribute them to the memory locations 112 (e.g., as bit corruption errors). Such inaccurate attribution may cause unnecessary, and therefore inefficient, operations (e.g., exception or error handling) to occur, such as by marking some blocks in the memory locations 112 as "bad" (e.g., so that the marked blocks are avoided during writes) when those blocks may not, in fact, have caused the errors when reading the data.

Therefore, the storage device 102 may be configured to perform error detection or data integrity checking during transfer of data to each of the memory locations 112 when a write operation is executed. To do so, the controller 123 may be configured to generate data integrity information based on at least one byte of data to be written to a respective one of the memory locations 112. For example, the data integrity information may include at least one parity bit or may include at least one ECC byte.

The controller 123 may be further configured to transfer the at least one byte of data and the data integrity information to the respective one of the memory locations 112 on the bus/interface. Specifically, the controller 123 may transfer the at least one byte of data on an I/O output (e.g., data bus and/or pin) to the respective one of the memory locations 112, whereas the controller 123 may transfer the data integrity information on at least one output (e.g., a pin mapped to WEn) to the respective one of the memory locations 112.

Correspondingly, the data integrity circuit(s) 115 may be configured to receive the at least one byte of data and the data integrity information from the controller 123 on the bus/interface for the respective one of the memory locations 112. In particular, the data integrity circuit(s) 115 may receive the at least one byte of data on an I/O input (e.g., data bus and/or pin) of the respective one of the memory locations 112, and may receive the data integrity information on at least one input (e.g., a pin mapped to WEn) of the respective one of the memory locations 112.

The data integrity circuit(s) 115 may then buffer the at least one byte of data, e.g., in volatile memory 118, while determining whether an error has occurred during transfer of the at least one byte of data on the bus/interface based on the data integrity information. In some embodiments, the data integrity circuit(s) 115 may perform error detection or data integrity checking using the data integrity information "on-the-fly," after which point the data integrity circuit(s) 115 may refrain from storing or buffering the data integrity information. For example, the data integrity circuit(s) 115 may receive the at least one byte of data and dynamically performing error detection or data integrity checking using the data integrity information as the at least one byte of data is received.

If the data integrity circuit(s) 115 determines that no errors have been detected in the at least one byte of data, then the data integrity circuit(s) 115 may program the buffered at least one byte of data in the respective one of the memory locations 112 (e.g., in one or more cells 116). However, if the data integrity circuit(s) 115 determines that an error is detected in the at least one byte of data based on the data integrity information, then the data integrity circuit(s) 115 may refrain from programming the buffered at least one byte of data in the respective one of the memory locations 112.

In some embodiments, when the data integrity circuit(s) 115 determines that an error is detected in the at least one byte of data based on the data integrity information, the data integrity circuit(s) 115 may indicate the detected error to the controller 123, such as by sending a write error response to a "status read" register with a "check write" command or as a "program" command. In response to receiving the write error response, e.g., on a "status read" register with "check write" command or a "program" command, the controller 123 may resend and/or reschedule the at least one data byte for transfer over the bus/interface to the respective one of the memory locations 112.

In some other embodiments, such as when the data integrity information includes at least one ECC byte, the data integrity circuit(s) 115 may attempt to correct the error based on the data integrity information (e.g., based on the at least one ECC byte) in order to recover the correct at least one byte of data. For example, the data integrity information may include a set of bits making up the ECC byte and corresponding to the at least one byte of data. The set of bits may be serially transmitted/received, e.g., on the WEn output/input contemporaneously with the at least one byte of data.

If the data integrity circuit(s) 115 is successful in correcting the error, then the data integrity circuit(s) 115 may program the corrected at least one byte of data in the respective one of the memory locations 112 (e.g., in one or more cells 116). However, if the data integrity circuit(s) 115 is unsuccessful in correcting the error (e.g., due to too many erroneous bits in the at least one byte of data), then the data integrity circuit(s) 115 may instead send an write error response to the controller 123 (e.g., as described herein).

Additional and/or further embodiments of such error detection or data integrity checking during data transfer of write operations are described herein.

Figure 3:
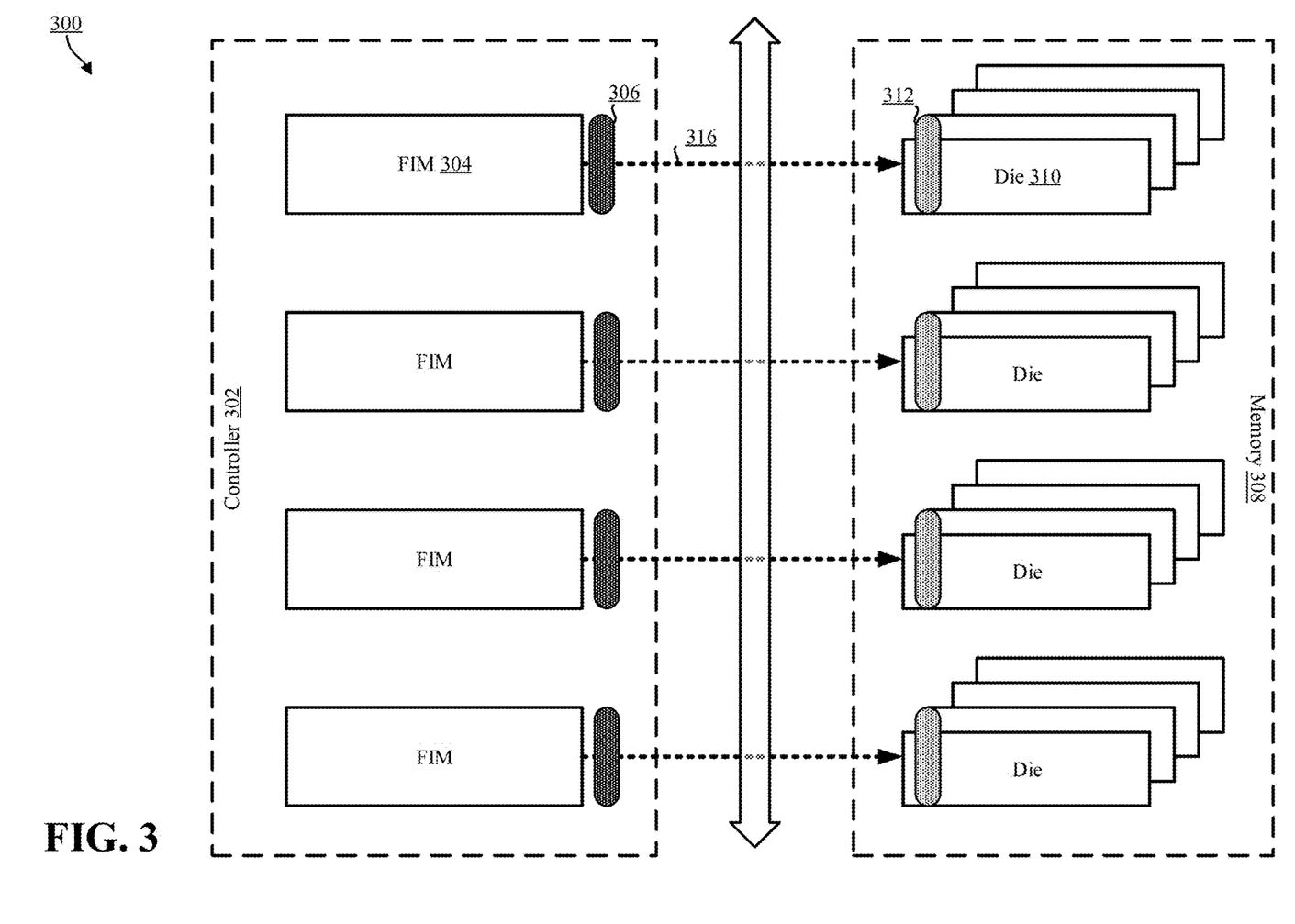
FIG. 3 is a conceptual diagram illustrating an example of a storage device configured to generate and check data integrity information for data transfer of write operations.

FIG. 3 is a conceptual diagram 300 illustrating an example of a controller 302 in communication with a memory 308. In the context of FIG. 1, for example, the controller 302 may be implemented as the controller 123, the memory 308 may be implemented as the NVM 110 (e.g., including or connected with the data integrity circuit(s) 115), and each die 310 may be implemented as one of the memory locations 112 (e.g., including or connected with the data integrity circuit(s) 115). In some other examples, however, the controller 302 and/or memory 308 may be implemented in another apparatus or may individually standalone as separate components outside of an apparatus.

As shown in FIG. 3, a storage device may include may include a controller 302 having a set of flash interface modules (FIMs), which may work in parallel or asynchronously with one other, e.g., to read and/or write data to the memory 308. The storage device may further include the memory 308 having a set of dies, and correspondingly, the dies may communicate with the FIMs.

The FIMs and the dies may be connected over a respective channel. For example, a representative channel 316 may be a bus or other interface, such as a TM bus. Illustratively, a representative FIM 304 may communicate with a representative die 310 via the channel 316.

The FIM 304 may be configured to execute operations in the die 310. For example, the FIM 304 may send signals to the die 310 on the channel 316 to read data, write data, erase data, and/or some other operations.

When the FIM 304 executes a write operation to write data in the die 310, the FIM 304 may transfer (or send) the data to the die 310 on the channel 316 (e.g., a write channel). Correspondingly, the die 310 may receive the data from the FIM 304 on the channel 316.

In order to implement error detection or data integrity checking during transfer of data on the channel 316, the FIM 304 may include or may be connected with a integrity information generator 306, which may be software, hardware, firmware or some combination thereof. When the FIM 304 is to write data (e.g., at least one byte of data) in the die 310, the FIM 304 may send the data through the integrity information generator 306, and the data may then be transferred to the die 310 on the channel 316.

The integrity information generator 306 may be configured to generate data integrity information based on the data. In some aspects, for example, the integrity information generator 306 may include an algorithm that outputs the data integrity information, which may be referred to as a "data integrity algorithm." Illustratively, the FIM 304 may pass the data to the integrity information generator 306 as an input, and the integrity information generator 306 may output the data integrity information with the data so that the data is transferred to the die 310 with the data integrity information.

In some embodiments, the data integrity information may include a parity bit. In such embodiments, the integrity information generator 306 may include a parity algorithm as the data integrity algorithm. For example, the parity algorithm may add together the number of 1 bits or the number of 0 bits, and then the parity algorithm selects either a 1 bit or a 0 bit as the data integrity information. For example, the algorithm may add together all the 1 bits in at least one byte of the data, and then the algorithm may determine whether the sum of all the 1 bits in the at least one byte of data is even or odd. The algorithm may then select a 0 bit as the data integrity information if the sum is even and a 1 bit as the data integrity information if the sum is odd (even parity), or vice versa (odd parity).

In some other embodiments, the data integrity information may include a set of bits—e.g., the data integrity information may include a byte. For example, the integrity information generator 306 may include an ECC algorithm as the data integrity algorithm. An ECC algorithm may generate the set of bits for the data integrity information based on inputting the at least one byte of data, such as a Hamming ECC algorithm, turbo coding algorithm, convolutional code algorithm, or other similar algorithm in which the data integrity information includes redundant data from the at least one byte of data. In other words, the data integrity information may include redundancy bits encoded from the at least one byte of data. Different ECC algorithms may be possible without departing from the scope of the present disclosure.

When the controller 302 executes a write operation so that the at least one byte of data is transferred across the bus to the memory 308, the channel 316 may carry bits (and bytes) from a set of outputs at the FIM 304 (which may be set by the integrity information generator 306) to a set of inputs at the die 310. In particular, the FIM 304 may include at least an I/O output and a WEn output, which may be connected with an I/O input and a WEn input, respectively, included at the die 310.

The FIM 304 may transfer the at least one byte of data for the write operation at the I/O output. Correspondingly, the die 310 may receive the at least one byte of data at the I/O input. In some embodiments, however, the FIM 304 (or integrity information generator 306) may transfer the data integrity information that is based on the at least one byte of data at the WEn output, and therefore, the die 310 may receive the data integrity information at the WEn input. Thus, the controller 302 may transfer the at least one byte of data with the data integrity information to the memory 308; although, the at least one byte of data may be a different signal (e.g., on a different pin) than the data integrity information.

As the data integrity information may be sent on a WEn output and received on a WEn input, the controller 302 may configure the WEn output to carry data integrity information, e.g., instead of or in addition to WEn signals. For example, the controller 302 may configure FIM 304 to send data integrity information on the WEn output on a data path with data bytes also on the data path, e.g., instead of or in addition to sending a WEn signal on the WEn output on a control path to drive write operations.

To that end, the controller 302 may configure the memory 308 for error detection or data integrity checking during data transfer of write operations by configuring the die 310 to detect for the data integrity information on the WEn input when at least one byte of data is being transferred on the I/O input. For example, FIM 304 may transmit an indication (e.g., a signal) that the signals received on the WEn input (e.g., during data transfer of a write operation) are for error detection for bytes of data received on the I/O input. Accordingly, the die 310 may continue to detect signals on the WEn input during transfer of bytes of data received on the I/O input, and the die 310 may use those signals detected on the WEn input during data transfer as the data integrity information for the data bytes.

The set of inputs at the die 310 may pass through a integrity information checker 312, which may be included in or connected to the die 310 and may be implemented as software, hardware, firmware, or some combination thereof. The integrity information checker 312 may be configured to detect whether there is at least one error in the at least one byte of data based on the data integrity information. When so doing, the at least one byte of data may be held in a buffer, rather than directly written in the die 310.

Similar to the integrity information generator 306, the integrity information checker 312 may be configured with an algorithm with which the integrity information checker 312 may detect for errors in the at least one byte of data transferred over the channel 316. In some embodiments, when the data integrity information includes a parity bit, the integrity information checker 312 may include a parity algorithm, which may be configured similarly to the integrity information generator 306 (e.g., configured for even parity or odd parity).

For example, the integrity information checker 312 may include a parity algorithm into which the at least one byte of data is input, and the algorithm may add together all the 1 bits in at least one byte of the data, and then the algorithm may determine whether the sum of all the 1 bits in the at least one byte of data is even or odd. The algorithm may then select a 0 bit as an expected information if the sum is even and a 1 bit as the expected information if the sum is odd (even parity), or vice versa (odd parity).

Subsequently, the integrity information checker 312 may obtain the expected information (e.g., expected information) as an output of the algorithm, and may compare the expected information with the data integrity information. If the integrity information checker 312 determines that the expected information matches the data integrity information (e.g., both are 1 bits or both are 0 bits), then the integrity information checker 312 may determine that no errors occurred in the data transfer of the write operation. Accordingly, the at least one byte of data may be programmed from the buffer into the die 310.

If the integrity information checker 312 determines that the expected information does not match the data integrity information (e.g., one information is a 1 bit and the other is a 0 bit), then the integrity information checker 312 may determine that an error occurred in the data transfer of the write operation. In response to detecting the error in the data transfer based on the data integrity information, then the die 310 may refrain from programming the at least one byte of data from the buffer into the die 310.

Further in response to detecting the error in the data transfer based on the data integrity information, the die 310 may send a write error response to the FIM 304. For example, the die 310 may send the write error response as "status read" with "check write" command or a "program" command. In response to receiving the write error response, the FIM 304 may retransfer (and/or reschedule) the at least one byte of data in order to reattempt a successful transfer of the at least one byte of data for the write operation.

In some other embodiments, the data integrity information may include a set of bits—e.g., the data integrity information may include a byte. For example, the integrity information checker 312 may include an ECC algorithm that generates a set of expected bits based on the at least one data byte, e.g., the ECC algorithm may include a Hamming ECC decoder. Different ECC algorithms may be possible without departing from the scope of the present disclosure.

Subsequently, the integrity information checker 312 may obtain the set of expected bits as an output of the algorithm, and may compare the set of expected bits with the data integrity information ECC bits to detect at least one error in the at least one byte of data. If the integrity information checker 312 detects at least one error in the at least one byte of data, then potentially, the integrity information checker 312 may correct at least one bit in the at least one byte of data. If no other errors are detected in the at least one byte of data, then the at least one byte of data having the corrected at least one bit may be programmed from the buffer into the die 310. However, if the integrity information checker 312 is unable to correct all the errors detected in the at least one bit, then the die 310 may refrain from programming the at least one byte of data from the buffer, and may send a write error response to the FIM 304.

In some embodiments, the integrity information generator 306 and integrity information checker 312 may be preconfigured with the aforementioned algorithms. In some other embodiments, the controller 302 may configure the memory 308 with a suitable algorithm corresponding to the algorithm implemented at the controller side. For example, the FIM 304 may transmit information indicating which algorithm the integrity information generator 306 is to use to generate the data integrity information that will be transferred with the data bytes during write operations. Illustratively, such information may indicate whether even parity or odd parity is to be used for error detection of the data bytes, whether the data integrity information includes a parity bit or includes an ECC byte for one or more data bytes, and/or other information indicating how the error detection/data integrity checking is to be implemented through the data integrity information transferred with the data bytes.

The die 310 may then receive the information indicating which algorithm the integrity information generator 306 is to use to generate data integrity information. Accordingly, the integrity information checker 312 may be configured with a corresponding algorithm consistent with the information received from the FIM 304. That is, the integrity information generator 306 and the integrity information checker 312 may be configured with corresponding error detection/data integrity checking algorithms (e.g., parity, ECC, or another such algorithm) so that the integrity information checker 312 may accurately detect (and potentially correct) erroneous bits in data bytes in response to receiving data integrity information with data bytes during data transfer of write operations.

Figure 4:
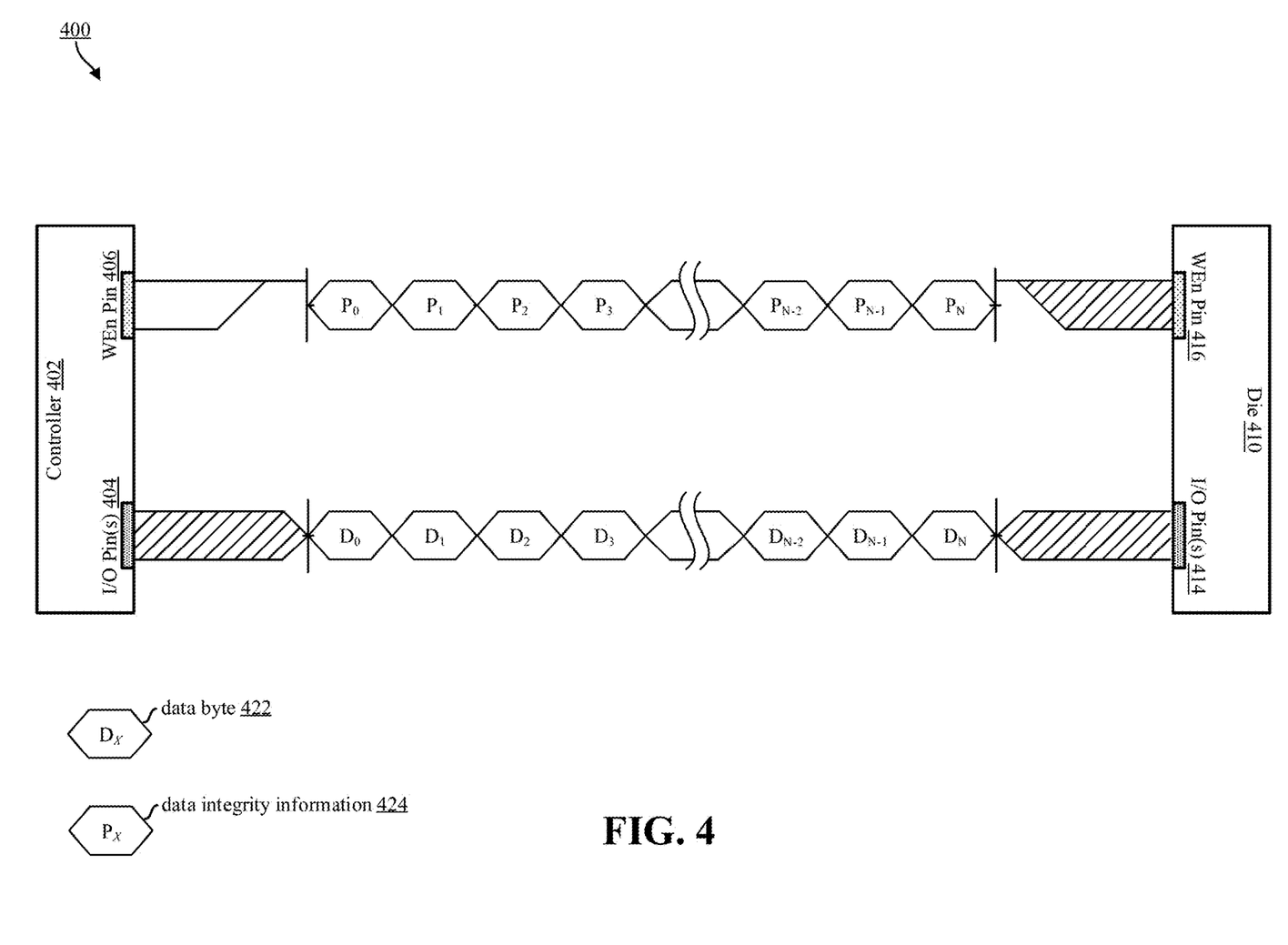
FIG. 4 is a conceptual diagram illustrating an example of a timing diagram for transferring data integrity information on a pin during transfer of data bytes on an input/output pin for a write operation.

FIG. 4 is a conceptual diagram illustrating an example of a timing diagram for transferring data integrity information on a write enable pin during transfer of data bytes on an input/output pin for a write operation. In the context of FIGS. 1 and 3, the controller 402 may be implemented as the controller 123 and/or the controller 302, and the die 410 may be implemented as one of the NVM 110 (e.g., including or connected with the data integrity circuit(s) 115), the memory locations 112 (e.g., including or connected with the data integrity circuit(s) 115), the memory 308, and/or the die 310.

As illustrated, the controller 402 and the die 410 may each include a respective one of the I/O pins 404, 414 and a respective one of the WEn pins 406, 416. The I/O pins 404, 414 and the WEn pins 406, 416 may be respectively connected across a bus (e.g., the channel 316 of FIG. 3) and/or other interface. In some other embodiments, the pins 406, 416 may be implemented as a pair of connected pins configured to carry another signal different from the WEn. For example, the pins 406, 416 may be implemented as an existing pair of connected pins or as a new pair of connected pins (e.g., each of the pins 406, 416 may be configured to carry data integrity information, either serially or in parallel and contemporaneous with corresponding data on the I/O pins 404, 414). In some further embodiments, the pins 406, 416 may be respectively implemented on the I/O pins 404, 414—in other words, data integrity information may be carried on the data bus, e.g., as redundant information for data on the data bus and/or as data integrity information for data on the data bus.

In some embodiments, each of the I/O pin(s) 404 at the controller 402 and I/O pin(s) 414 at the die 410 may include multiple I/O pins, such as four pins, eight pins (e.g., one byte in parallel), or sixteen pins, e.g., such that data bits may be transferred in parallel on the data bus. It will be appreciated that the controller 402 may have multiple sets of I/O and WEn pins, each of I/O and WEn pins may be connected with a respective die, e.g., similar to die 410, in order to transfer data to multiple dies.

When the controller 402 has data to be programmed into memory, including the die 410, the controller 402 may execute a write operation. For example, the controller 402 may initialize the die 410 to receive data—e.g., the controller 402 may transmit a WEn signal to the die 410 that drives detection of data bytes on the I/O pin(s) 414 of the die 410 when transferred on the I/O pin(s) 404 of the controller 402.

As described, herein, however, the WEn pins 406, 416 may be repurposed (or reused) to communicate data integrity information that allow for error detection (or data integrity checking) of the data on the I/O pins 404, 414. Thus, the controller 402 may be configured to generate data integrity information 424 based on at least one data byte 422. The controller 402 may then transfer the data integrity information 424 with the at least one data byte 422 to the die. However, the at least one data byte 422 may be transferred on the I/O pin(s) 404, whereas the data integrity information 424 may be transferred on the WEn pin 406.

Correspondingly, the die 410 may be configured to receive the at least one data byte 422 on the I/O pin(s) 414 and receive the data integrity information on the WEn pin 416. The die 410 may then detect for errors in the at least one data byte 422 in response to receiving the data integrity information 424. In some embodiments, the die 410 may be further configured to correct an error in the at least one data byte 422 in response to receiving the data integrity information 424, e.g., when the data integrity information 424 is implemented as ECC.

In some embodiments, the data integrity information 424 may be implemented as a parity bit. As illustrated, for example, the data integrity information 424 may be one bit that is generated based on at least data byte 422 that is transferred with the data integrity information 424. While FIG. 4 illustrates respective data integrity information 424 corresponding to a single data byte 422, respective data integrity information 424 potentially may correspond to more than one data bytes without departing from the scope of the present disclosure (e.g., data integrity information could be generated and transferred with every two, three, four, etc. data bytes).

In some other embodiments, the data integrity information 424 may be implemented as an ECC byte. For example, the data integrity information 424 may be one ECC byte that is generated based on at least data byte 422 (e.g., generated based on two, four, eight data bytes) that is transferred with the data integrity information 424.

During transfer of a write operation, the data integrity information 424 may be serialized across the WEn pins 406, 416, whereas the at least one data byte 422 may be include eight bits in parallel across the I/O pins 404, 414. In some embodiments, the data integrity information 424 may be a bit that is toggled from across the WEn pins 406, 416 at the same speed as the data byte 422 across the I/O pins 404, 414. For example, the controller 402 may toggle (e.g., to either a 1 bit or a 0 bit) the signal across the WEn pins 406, 416 based on each data integrity information corresponding to at least one respective data byte. Illustratively, when the data integrity information is implemented using ECC, then the controller 402 may toggle the signal across the WEn pins 406, 416 based on each bit of data integrity information ECC byte that corresponds to at least one (potentially multiple) respective data byte.

As illustrated, the controller 402 may transfer a set of data bytes $D_0, D_1, \ldots, D_{N-1}, D_N$ to the die 410 during data transfer of a write operation. For at least one of the set of data bytes, the controller 402 may generate (e.g., on-the-fly) one of a set of data integrity information $P_0, P_1, \ldots, P_{N-1}, P_N$. When the controller 402 transfers a data byte 422 from the I/O pin(s) 404, the controller 402 may also transfer data integrity information 424 from the WEn pin 406.

For example, the controller 402 may transfer data bytes $D_0, D_1, \ldots, D_{N-1}, D_N$ from the I/O pin(s) 404, and contemporaneous with a respective one of the data bytes $D_0, D_1, \ldots, D_{N-1}, D_N$, the controller 402 may also transfer a respective one of the data integrity information $P_0, P_1, \ldots, P_{N-1}, P_N$ from the WEn pin 406. In other words, in a window in which $D_0$ is transferred across the bus on I/O pin(s) 404, $P_0$ is also transferred across the bus on WEn pin 406.

Accordingly, die 410 may receive data bytes $D_0$, $D_1, \ldots, D_{N-1}, D_N$ at the I/O pin(s) 414, and contemporaneous with a respective one of the data bytes $D_0, D_1, \ldots, D_{N-1}, D_N$, the die 410 may also receive a respective one of the data integrity information $P_0, P_1, \ldots, P_{N-1}, P_N$ at the WEn pin 416. In other words, in a window in which Do is received across the bus on I/O pin(s) 414, $P_0$ is also received across the bus on WEn pin 416.

In some embodiments, as the die 410 contemporaneously receives each of the data bytes $D_0, D_1, \ldots, D_{N-1}, D_N$ at the I/O pin(s) 414 and each of the data integrity information $P_0, P_1, \ldots, P_{N-1}, P_N$ at the WEn pin 416, the die 410 may perform error detection for each of the data bytes $D_0, D_1, \ldots, D_{N-1}, D_N$ based on a respective one of the data integrity information $P_0, P_1, \ldots, P_{N-1}, P_N$. For example, when die 410 receives $D_0$ on I/O pin(s) 414 and $P_0$ on WEn pin 416, the die 410 may generate (on-the-fly) an expected information based on $D_0$. The die 410 may then compare the expected information with $P_0$ to detect whether any errors are present in $D_0$. If no errors are detected (e.g., if the expected information is determined to match $P_0$), then the die 410 may program $D_0$ in the die 410 (e.g., in a block and/or cell).

However, if the die detects an error (e.g., if the expected information is determined to not match $P_0$), then the die 410 refrain from writing $D_0$ in the die 410, and instead may discard $D_0$ from the buffer in which it is temporarily located. Further in response to detecting an error, the die 410 may send a write error response to the controller 402. In response to receiving the write error response, the controller 402 may retransmit (or reschedule) Do or the controller 402 may retry (or reschedule) the write operation including all of the data bytes $D_0, D_1, \ldots, D_{N-1}, D_N$.

In some other embodiments, as the die 410 contemporaneously receives each of the data bytes $D_0, D_1, \ldots, D_{N-1}, D_N$ at the I/O pin(s) 414 and each of the data integrity information $P_0, P_1, \ldots, P_{N-1}, P_N$ at the WEn pin 416, the die 410 may collect (e.g., buffer) the data integrity information $P_0, P_1, \ldots, P_{N-1}, P_N$ in order to recover data integrity information ECC byte. For example, the signals across the WEn pins 406, 416 may be toggled for each bit $P_0, P_1, \ldots, P_{N-1}, P_N$ of an ECC byte, and the ECC byte may correspond to one some or all of the data bytes $D_0, D_1, \ldots, D_{N-1}, D_N$.

The die 410 may then use the bits $P_0, P_1, \ldots, P_{N-1}, P_N$ of the ECC byte to detect an error in the data bytes $D_0, D_1, \ldots, D_{N-1}, D_N$. If the die 410 detects an error based on the bits $P_0, P_1, \ldots, P_{N-1}, P_N$ of the ECC byte, then the die 410 may attempt to correct the error in the data bytes $D_0, D_1, \ldots, D_{N-1}, D_N$ based on the bits $P_0, P_1, \ldots, P_{N-1}, P_N$ of the ECC byte. However, if the die 410 detects too many errors (e.g., more than one error) or is unable to correct the error in the data bytes, then the die 410 may refrain from writing the data bytes $D_0, D_1, \ldots, D_{N-1}, D_N$ in the die 410, and instead may discard the data bytes $D_0, D_1, \ldots, D_{N-1}, D_N$ from the buffer in which the data bytes are temporarily located. Further in response to detecting too many errors or being unable to correct the error in the data bytes, the die 410 may send a write error response to the controller 402.

Figure 5:
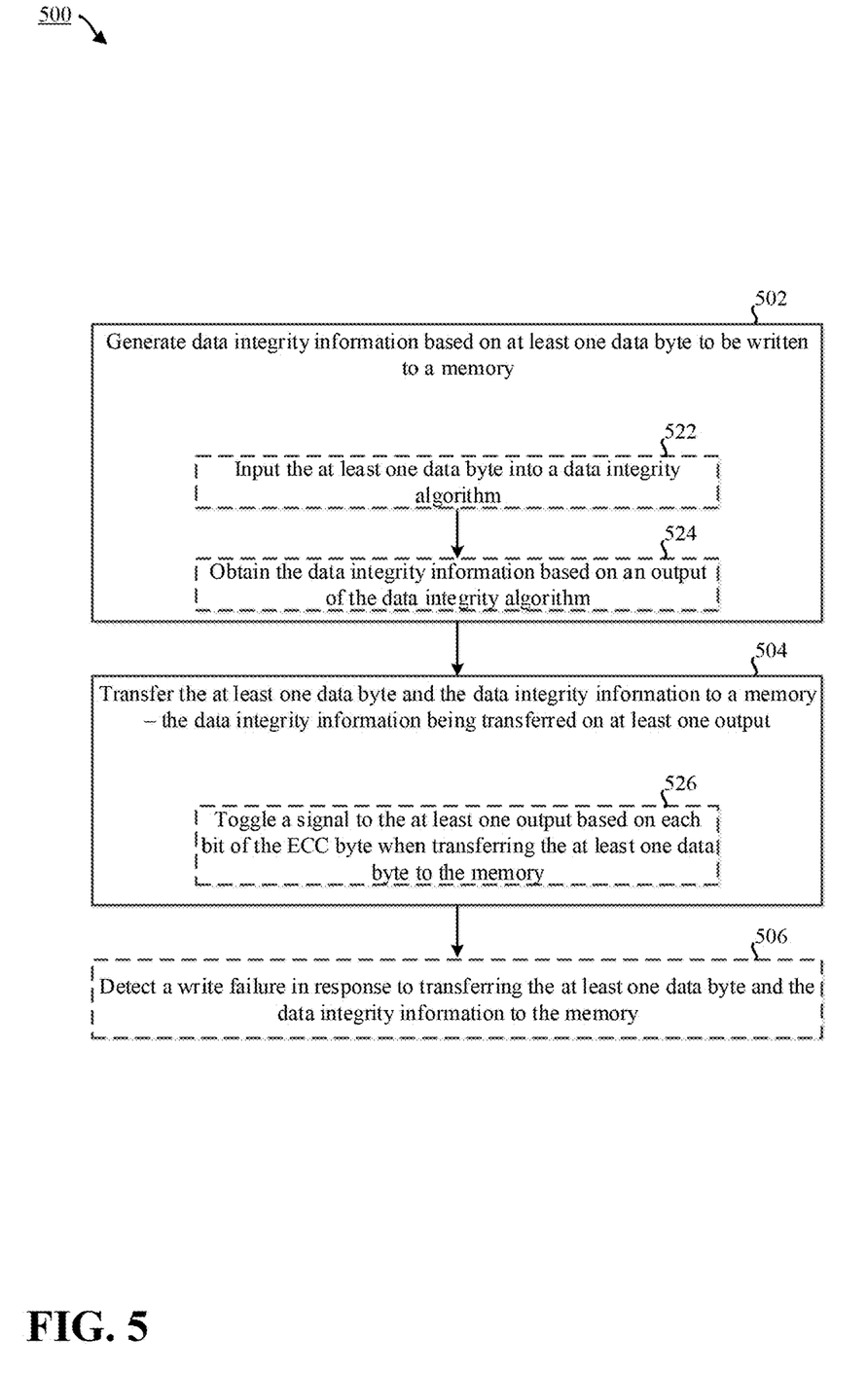
FIG. 5 is a flowchart illustrating a method for generating data integrity information for bytes of data transferred during a write operation, which may be performed by the storage device of FIG. 1.

FIG. 5 is a flowchart 500 illustrating a method for generating data integrity information for bytes of data transferred during a write operation. For example, the method may be performed in a storage device, such as the storage device 102 illustrated in FIG. 1, a storage device including the controller 302 illustrated in FIG. 3, and/or a storage device including the controller 402 illustrated in FIG. 4. Each of the operations in the method can be controlled using a controller (e.g., the controller 123, 302, 402) or by some other suitable means.

As represented by block 502, the controller may generate data integrity information based on at least one data byte to be written to a memory. For example, referring to FIG. 1, the controller 123 may generate data integrity information based on at least one data byte to be written to a respective one of the memory locations 112.

In some embodiments, block 502 may include block 522 and block 524. As represented by block 522, the controller may input the at least one data byte into a data integrity algorithm. For example, referring to FIG. 1, the controller 123 may input the at least one data byte into a data integrity algorithm.

As represented by block 524, the controller may obtain the data integrity information based on an output of the data integrity algorithm. For example, referring to FIG. 1, the controller 123 may obtain the data integrity information based on an output of the data integrity algorithm.

As represented by block 504, the controller may transfer the at least one data byte and the data integrity information to a memory. The data integrity information may be transferred on a WEn output of the memory. For example, referring to FIG. 1, the controller 123 may transfer the at least one data byte and the data integrity information to the respective one of the memory locations 112, and the data integrity information may be transferred on a WEn output of the respective one of the memory locations 112.

In some embodiments, block 504 may include block 526. As represented by block 526, when the data integrity information include an ECC byte, the controller may toggle a signal on the WEn output based on each bit of the ECC byte when transferring the at least one data byte to the memory. For example, referring to FIG. 1, when the data integrity information include an ECC byte, the controller 123 may toggle a signal on the WEn output based on each bit of the ECC byte when transferring the at least one data byte to the respective one of the memory locations 112.

As represented by block 506, the controller may detect a write failure in response to transferring the at least one data byte and the data integrity information to the memory. For example, referring to FIG. 1, the controller 123 may detect a write failure in response to transferring the at least one data byte and the data integrity information to the respective one of the memory locations 112.

Figure 6:
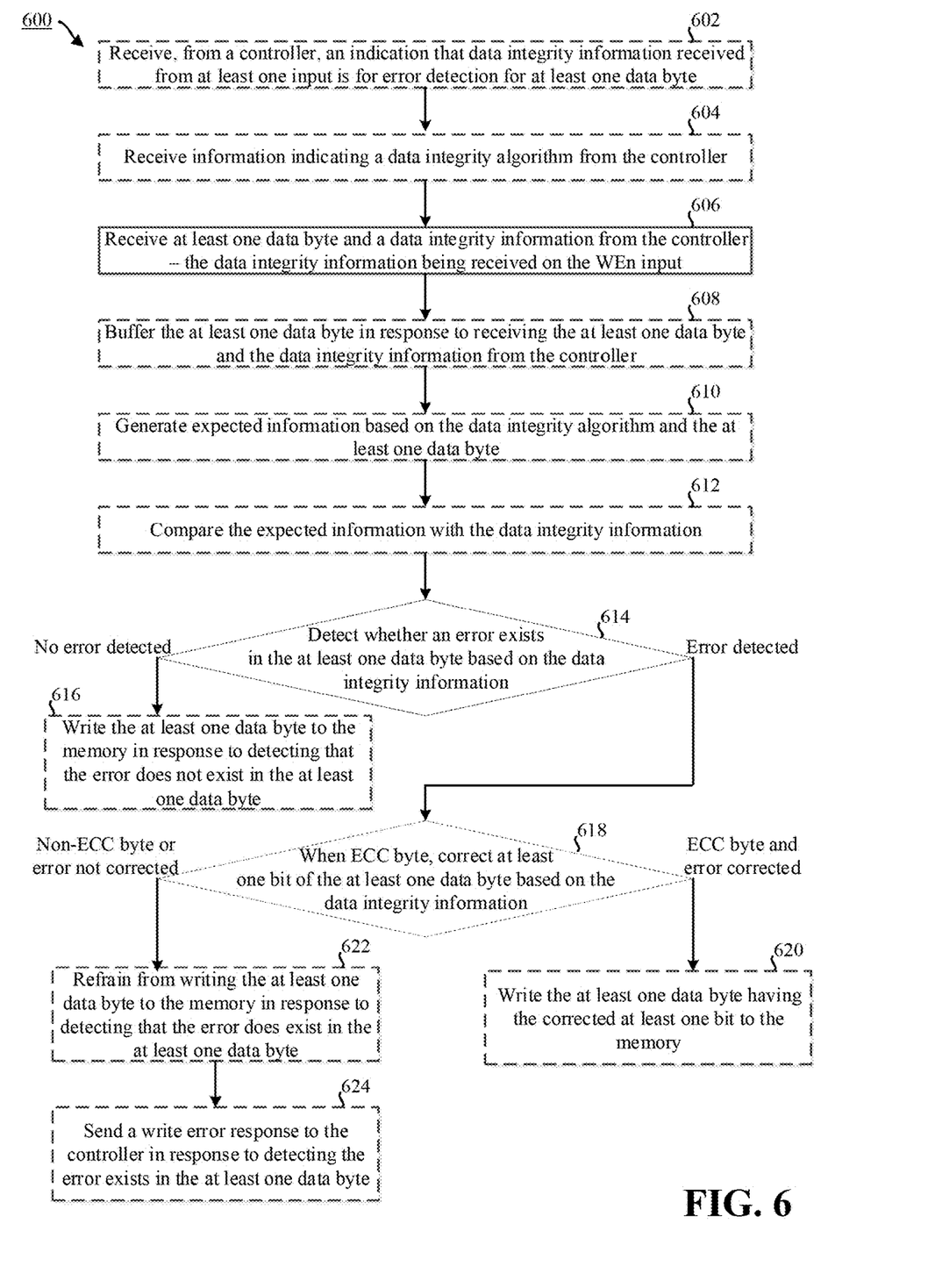
FIG. 6 is a flowchart illustrating a method for checking data integrity information for bytes of data transferred during a write operation, which may be performed by the storage device of FIG. 1.

FIG. 6 illustrates an example flowchart 600 of a method for checking data integrity information for bytes of data transferred during a write operation in a memory. For example, the method may be performed in a storage device, such as the storage device 102 illustrated in FIG. 1, a storage device including the die 310 illustrated in FIG. 3, and/or a storage device including the die 410 illustrated in FIG. 4. Each of the operations in the method can be controlled using a data integrity circuit (e.g., the data integrity circuit(s) 115), die (e.g., the die 310, 410), or by some other suitable means.

As represented by block 602, the data integrity circuit may receive, from a controller, an indication that data integrity information received from an input is for error detection for at least one data byte. For example, referring to FIG. 1, the data integrity circuit(s) 115 may receive, from the controller 123, an indication that data integrity information received from a WEn input is for error detection for at least one data byte.

As represented by block 604, the data integrity circuit may receive information indicating a data integrity algorithm from the controller. For example, referring to FIG. 1, the data integrity circuit(s) 115 may receive information indicating a data integrity algorithm from the controller 123.

As represented by block 606, the data integrity circuit may receive at least one data byte and data integrity information from the controller, and the data integrity information may be received on the input (e.g., WEn input). For example, referring to FIG. 1, the data integrity circuit(s) 115 may receive at least one data byte and data integrity information from the controller 123, and the data integrity information may be received on the WEn input.

As represented by block 608, the data integrity circuit may buffer the at least one data byte in response to receiving the at least one data byte and the data integrity information from the controller. For example, referring to FIG. 1, the data integrity circuit(s) 115 may buffer the at least one data byte in the volatile memory 118 in response to receiving the at least one data byte and the data integrity information from the controller 123.

As represented by block 610, the data integrity circuit may generate an expected information based on the data integrity algorithm and the at least one data byte. For example, referring to FIG. 1, the data integrity circuit(s) 115 may generate an expected information based on the data integrity algorithm and the at least one data byte.

As represented by block 612, the data integrity circuit may compare the expected information with the data integrity information. For example, referring to FIG. 1, the data integrity circuit(s) 115 may compare the expected information with the data integrity information.

As represented by block 614, the data integrity circuit may detect whether an error exists in the at least one data byte based on the data integrity information. For example, referring to FIG. 1, the data integrity circuit(s) 115 may detect whether an error exists in the at least one data byte based on the data integrity information.

If no error is detected, then as represented by block 616, the data integrity circuit may write the at least one data byte to the memory in response to detecting that the error does not exist in the at least one data byte. For example, referring to FIG. 1, the data integrity circuit(s) 115 may write the at least one data byte to one of the memory locations 112 in response to detecting that the error does not exist in the at least one data byte.

If an error is detected, then as represented by block 618, when the data integrity information includes an ECC byte, the data integrity circuit correct at least one bit of the at least one data byte based on the data integrity information. For example, referring to FIG. 1, when the data integrity information includes an ECC byte, the data integrity circuit(s) 115 may correct at least one bit of the at least one data byte based on the data integrity information.

If the data integrity information includes an ECC byte and the error(s) are corrected, then as represented by block 620, the data integrity circuit may write the at least one data byte having the corrected at least one bit to the memory. For example, referring to FIG. 1, the data integrity circuit(s) 115 may write the at least one data byte having the corrected at least one bit to the one of the memory locations 112.

If the data integrity information does not include an ECC byte or the error(s) are not corrected, then as represented by block 622, the data integrity circuit may refrain from writing the at least one data byte to the memory in response to detecting that the error does exist in the at least one data byte. In some embodiments, the data integrity circuit may count each error detected per page transmission and determine whether to discard the at least one data byte or write the at least one data byte to the memory based on the error detection count. Illustratively, the data integrity circuit may compare the error detection count to a threshold information. If data integrity circuit determines that the error detection count satisfies the threshold (e.g., is less than the threshold), then the data integrity circuit may write the page including the at least one data byte to the memory. If data integrity circuit determines that the error detection count does not satisfy the threshold (e.g., is less than the threshold), then the data integrity circuit may refrain from writing the page including the at least one data byte to the memory. For example, referring to FIG. 1, the data integrity circuit(s) 115 may refrain from writing the at least one data byte to the one of the memory locations 112 in response to detecting that the error does exist in the at least one data byte.

As represented by block 624, the data integrity circuit may send a write error response to the controller in response to detecting the error exists in the at least one data byte. In one embodiment, the write error response may be a bit or other signal sent to a "status read" register with a "check write" command or as a "program" command. In another embodiment, the write error response may include multiple bits (or even bytes)—e.g., the write error response may generate a report by counting the number of detected errors on a page transmission. Potentially, block 624 may be avoided if the data integrity circuit determines the error detection count satisfies the threshold and writes the page including the at least one data byte to the memory. For example, referring to FIG. 1, the data integrity circuit(s) 115 may send a write error response to the controller 123 in response to detecting the error exists in the at least one data byte.

Accordingly, the present disclosure provides various embodiments of a storage device that is configured to detect errors and check data integrity during transfer of data to memory for write operations. Such embodiments may improve upon approaches in which error detection and data integrity checking is absent from the data transfer phases of write operations. Specifically, such embodiments improve upon approaches in which error detection and data integrity checking is absent from the data transfer phases of write operations because the absence of error detection or data integrity checking may prevent errors that occur during data transfer phases from being detected, e.g., until the data is retrieved using a read operation, at which point the errors may be misattributed to the memory, when in fact, the errors occurred on the bus, interface, or other section of the data transfer phase.

Various embodiments of the present disclosure describe data integrity information that is transferred with data during data transfer of a write operation, and the data integrity information provides a mechanism for detecting errors and checking data integrity during data transfer. In some examples, the data integrity information may be transferred on a WEn pin or WEn output, and correspondingly received or detected on a WEn pin or WEn input. By reusing (or repurposing) the WEn pins or WEn output/input, additional pins or output/inputs may be unnecessary, and such error detection and data integrity checking using data integrity information may be implemented using existing interfaces and/or buses.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. An apparatus, comprising:
a memory; and
a controller coupled to the memory and configured to:
generate data integrity information based on at least one data byte to be written to the memory,
transfer the at least one data byte to the memory, and
transfer the data integrity information on at least one output to the memory during the transfer of the at least one data byte in a write operation of the at least one data byte with the memory.

2. The apparatus of claim 1, wherein the data integrity information comprises a parity bit generated based on the at least one data byte.

3. The apparatus of claim 1, wherein the data integrity information comprises an error correction code (ECC) byte, and the controller is further configured to:
toggle a signal on the at least one output based on each bit of the ECC byte when transferring the at least one data byte to the memory.

4. The apparatus of claim 1, wherein the controller is further configured to:
detect a write failure in response to transferring the at least one data byte and the data integrity information to the memory.

5. The apparatus of claim 1, wherein the generation of the data integrity information based on the at least one data byte comprises to:
input the at least one data byte into a data integrity algorithm; and
obtain the data integrity information based on an output of the data integrity algorithm.

6. The apparatus of claim 1, further comprising:
a data integrity circuit connected to the memory and configured to:
receive the at least one data byte and the data integrity information from the controller; and
detect whether an error exists in the at least one data byte based on the data integrity information.

7. The apparatus of claim 6, wherein the data integrity circuit is further configured to:
buffer the at least one data byte in response to receiving the at least one data byte and the data integrity information from the controller; and
write the at least one data byte to the memory in response to detecting that the error does not exist in the at least one data byte, or refrain from writing the at least one data byte to the memory in response to detecting that the error does exist in the at least one data byte.

8. The apparatus of claim 6, wherein the data integrity circuit is further configured to:
receive, from the controller, an indication that the data integrity information received from the at least one output is for error detection for the at least one data byte,
wherein the detection of whether the error exists is further based on the indication.

9. The apparatus of claim 6, wherein the data integrity circuit is further configured to:
send a write error response to the controller in response to detecting the error exists in the at least one data byte.

10. The apparatus of claim 6, wherein the data integrity circuit is further configured to:
correct at least one bit of the at least one data byte based on the data integrity information; and
write the at least one data byte having the corrected at least one bit to the memory.

11. The apparatus of claim 6, wherein the data integrity circuit is further configured to:
receive information indicating a data integrity algorithm from the controller;
generate an expected information based on the data integrity algorithm and the at least one data byte; and
compare the expected information with the data integrity information,
wherein the detection of whether the error exists is further based on the comparison of the expected information with the data integrity information.

12. The apparatus of claim 1, wherein the at least one output comprises a write enable output.

13. An apparatus, comprising:
a memory; and
a controller configured to:
set at least one bit for data integrity based on data to be written to the memory,
send the data to the memory, and
send the at least one bit to at least one input of the memory during transfer of the data in a write operation of the data with the memory.

14. The apparatus of claim 13, wherein the at least one bit comprises a parity bit that is set based on the data.

15. The apparatus of claim 13, wherein the at least one bit comprises a plurality of bits included in at least one byte that is set for error correction code (ECC) of the data and the controller is further configured to:
send each of the plurality of bits of the at least one byte to the at least one input when sending the data to the memory.

16. The apparatus of claim 13, wherein the controller is further configured to:
receive an indication of a failure to write the data to the memory in response to sending the data to the memory with the at least one bit.

17. The apparatus of claim 13, wherein the at least one input comprises a write enable input.

18. An apparatus, comprising:
a memory; and
a data integrity circuit connected to the memory and configured to:
receive at least one bit on at least one input during transfer of data to the data integrity circuit in a write operation of the data with the memory, and
determine whether the data to be written to the memory is successfully received in response to receiving the at least one bit on the at least one input.

19. The apparatus of claim 18, wherein the data integrity circuit is further configured to:

buffer the data when determining whether the data to be written to the memory is successfully received; and write the data to the memory in response to determining that the data is successfully received, or refrain from writing the data to the memory in response to determining that the data is unsuccessfully received.

20. The apparatus of claim 18, wherein the at least one input comprises a write enable input.

* * * * *